(12) United States Patent  
Daly

(10) Patent No.: US 7,191,749 B2  
(45) Date of Patent: Mar. 20, 2007

(54) LASER WELDED INTAKE MANIFOLD

(75) Inventor: Paul Desmond Daly, Troy, MI (US)

(73) Assignee: Siemens Canada Limited, Chatham (CA)

( * ) Notice: Subject to any disclaimer, the term of this patent is extended or adjusted under 35 U.S.C. 154(b) by 58 days.

(21) Appl. No.: 10/885,174

(22) Filed: Jul. 6, 2004

(65) Prior Publication Data

US 2005/0005889 A1    Jan. 13, 2005

Related U.S. Application Data

(60) Provisional application No. 60/485,270, filed on Jul. 7, 2003.

(51) Int. Cl.  
*F02M 35/10* (2006.01)

(52) U.S. Cl. .................................. 123/184.61

(58) Field of Classification Search ........... 123/184.61, 123/184.47, 184.21, 184.31  
See application file for complete search history.

(56) References Cited

U.S. PATENT DOCUMENTS

| 5,156,117 | A  |    | 10/1992 | Muller et al.    |           |
|-----------|----|----|---------|------------------|-----------|
| 6,199,530 | B1 | *  | 3/2001  | Brassell et al.  | 123/184.34|
| 6,234,129 | B1 |    | 5/2001  | Brassell et al.  |           |
| 6,234,130 | B1 |    | 5/2001  | Brassell et al.  |           |
| 6,234,131 | B1 |    | 5/2001  | Brassell et al.  |           |
| 6,267,093 | B1 | *  | 7/2001  | Lohr ............ | 123/184.61|
| 6,279,528 | B1 |    | 8/2001  | Happenhofer et al.|          |
| 6,321,708 | B1 | *  | 11/2001 | Wehner et al.    | 123/184.61|
| 6,446,591 | B1 | *  | 9/2002  | Chae et al.      | 123/184.61|
| 6,467,449 | B2 | *  | 10/2002 | Brassell et al.  | 123/184.61|
| 6,532,928 | B2 | *  | 3/2003  | Ogata            | 123/184.61|
| 6,739,301 | B2 | *  | 5/2004  | Brassell et al.  | 123/184.61|
| 6,857,409 | B2 | *  | 2/2005  | Ito et al.       | 123/184.42|

FOREIGN PATENT DOCUMENTS

| EP | 1 174 247 | 1/2002  |
| JP | 62 49850  | 10/1987 |
| JP | 5 42336   | 6/1993  |

OTHER PUBLICATIONS

European Search Report dated Apr. 15, 2005.

* cited by examiner

*Primary Examiner*—Noah P. Kamen  
*Assistant Examiner*—Jason Benton

(57) ABSTRACT

Laser welding of plastic involves a laser passing through laser translucent then laser absorbent material. A technical description as envisaged here is Laser Contour Welding. Universally, laser welding is done by Quasi simultaneous techniques and rarely by Contour techniques. Regular or symmetrical parts, under 5 inches are welded by Quasi simultaneous. Asymmetric and large parts are best welded by Contour Welding.

Kinematics of robots permits a complex contour. Automotive plastic manifolds exceed 5 inches with asymmetry. The pairing of robot contour and laser welding facilitates a new Automotive manifold. It requires a new split line for laser access and manufacturing as described. Encompassing the above requirements and solutions can reduce the moldings for a V8 to 2 major operations.

13 Claims, 7 Drawing Sheets

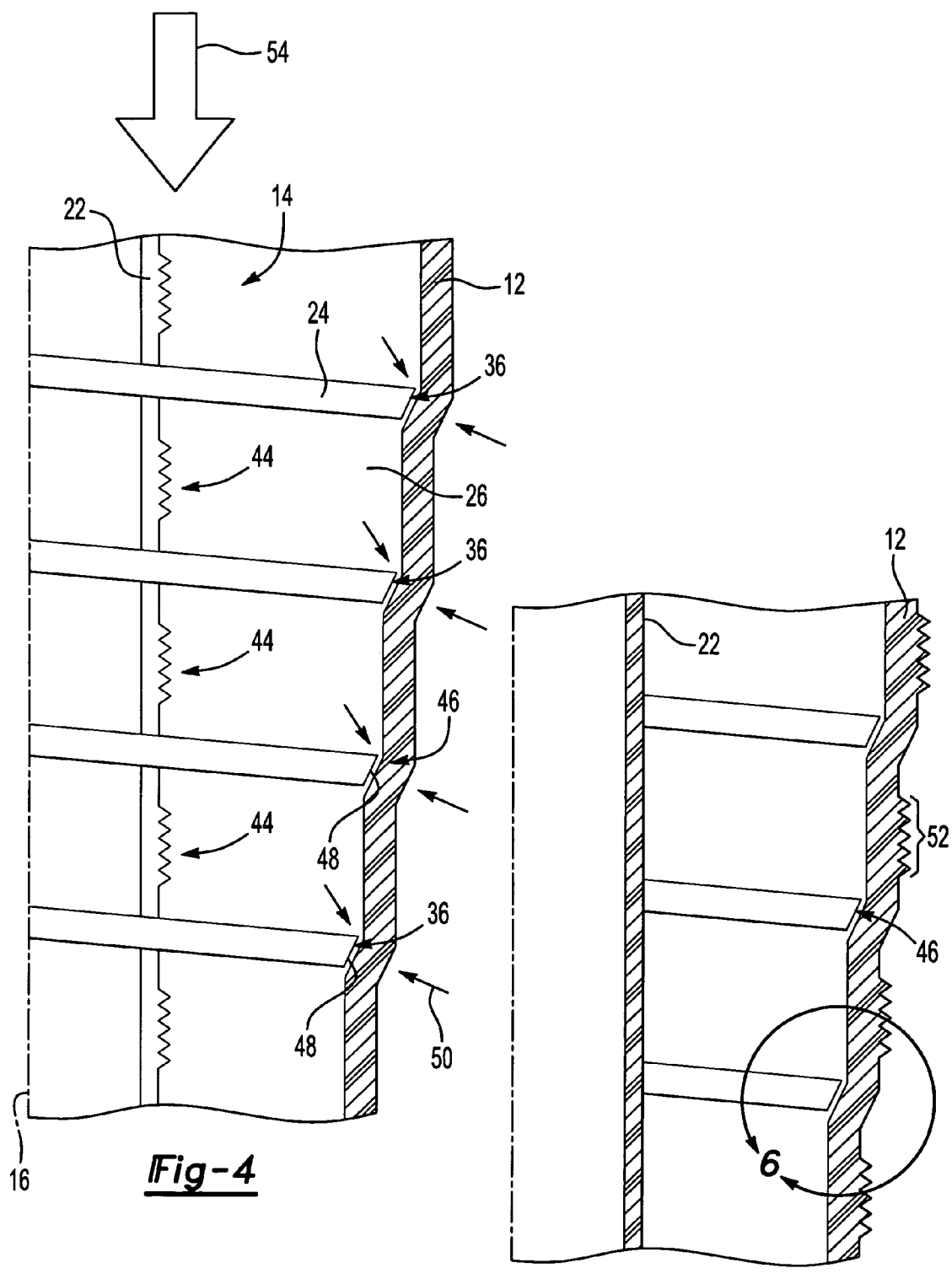

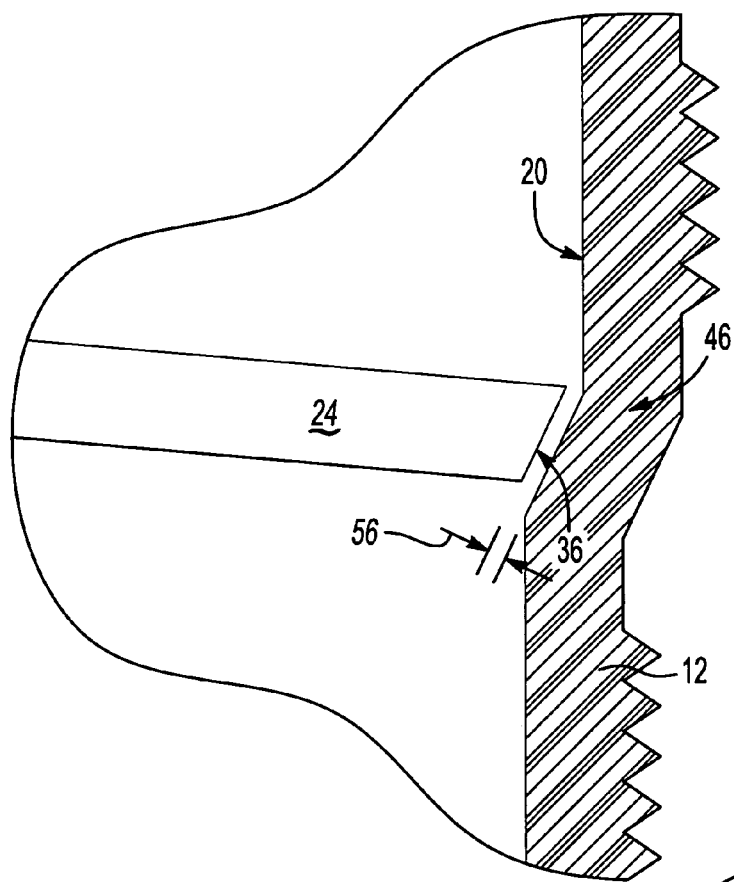
_Fig-6_
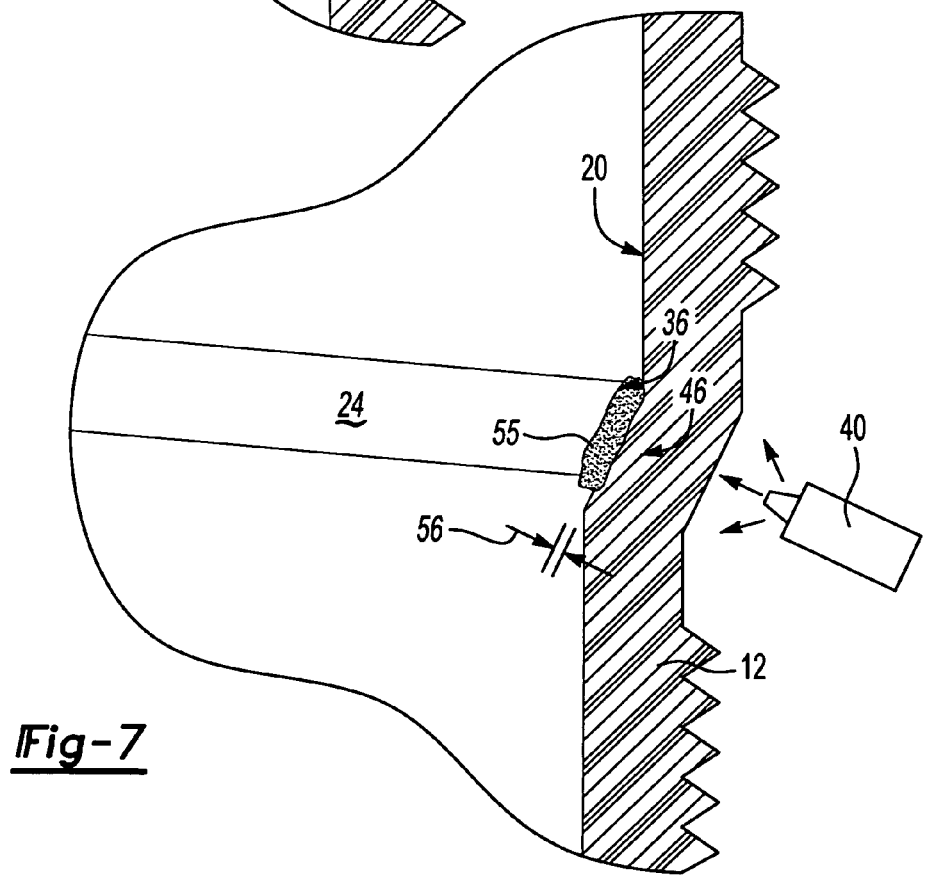
_Fig-7_

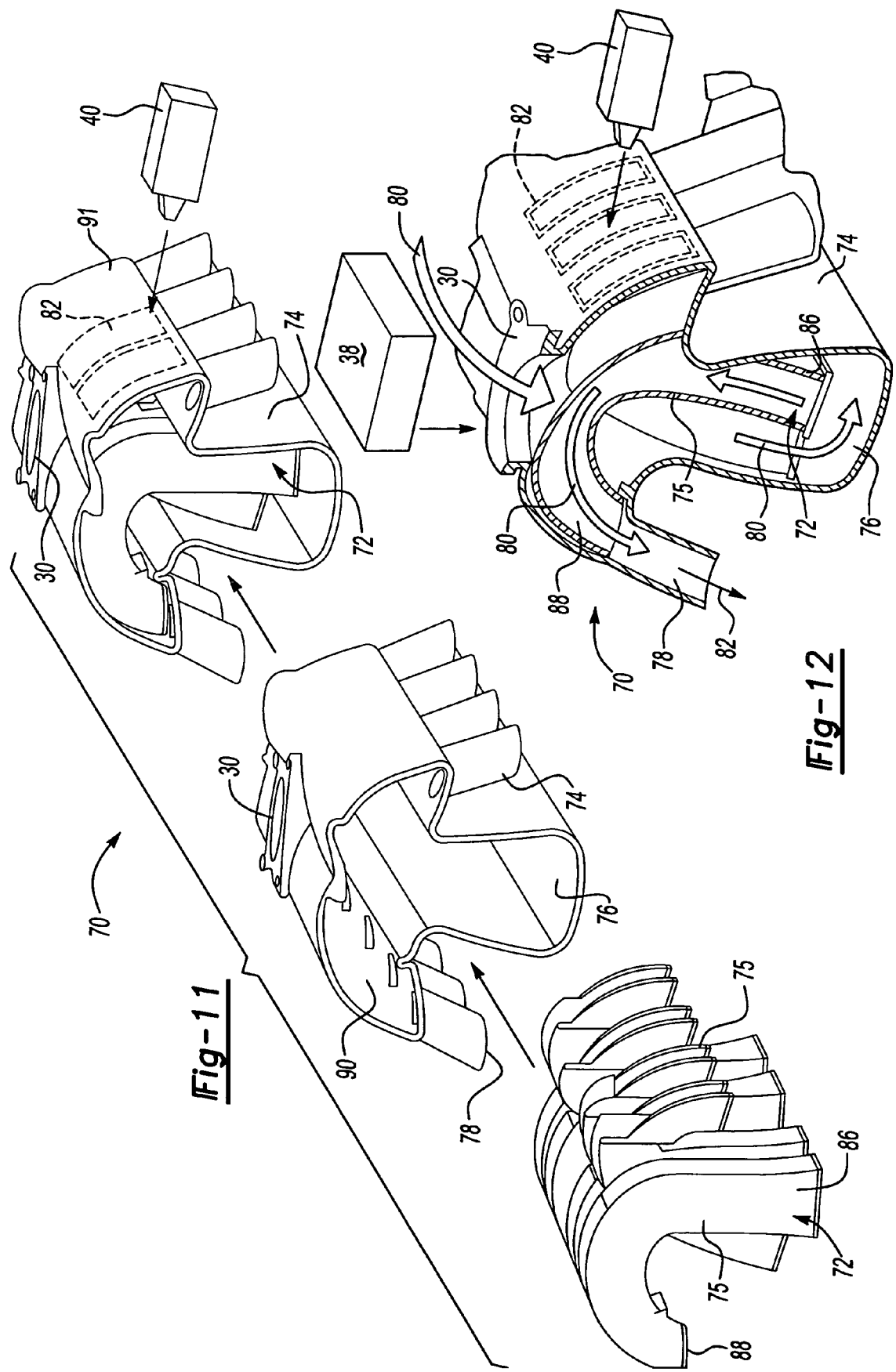

LASER WELDED INTAKE MANIFOLD

The application claims priority to U.S. Provisional Application No. 60/485,270 which was filed on Jul. 7, 2003.

BACKGROUND OF THE INVENTION

This invention is generally related to an intake manifold and a method of assembling an intake manifold. More particularly, this invention relates to an intake manifold fabricated from an inner shell inserted and welded within an outer shell utilizing a laser welding process.

Plastic intake manifolds have been developed for use in motor vehicles that provide reduced weight and cost. A plastic intake manifold is typically constructed from a plurality of parts that are molded separately and then joined to one another. Various methods are known for joining plastic parts including vibration welding. Joint configurations for these plastic parts typically include a complicated cross-section for providing sufficient melt down material as well as features for trapping flash. Such joint geometries contribute substantially to the cost of fabricating an intake manifold.

Further, vibrational welding methods lead to the design of plastic manifolds that are designed to include a series of horizontal or vertical slices. Horizontal and vertical slices result in a plurality of parts that must be joined. Further the many parts each require a separate molding tools and assembly stations that complicate assembly and increase overall cost. Additionally, if any of the joints in such a process are defective the intake manifold assembly cannot be repaired.

Laser welding has been used to join plastic parts with success. Laser welding of plastic is accomplished by directing a laser through a laser translucent material onto a laser absorbent material. Laser Transmission Contour Welding is known for use with large asymmetrical parts. Kinematics of robots has advanced to permit following a complex contour such as is typical of an intake manifold assembly. However, typically laser welding is simply applied to joints originally designed according to known conventions for producing a vibration-welded joint. There is still a plurality of parts that require many joints. Further, in some instances, parts are inaccessible once the manifold is complete. Such construction increases the likelihood that an improper joint may result in the entire intake manifold being unusable. Laser welding requires that the parts touch without substantial gaps and access to the joint for the laser-welding tool.

Accordingly, it is desirable to design a plastic intake manifold to take advantage of laser welding processes to reduce the number of parts and to reduce the number of joints.

SUMMARY OF THE INVENTION

This invention is a plastic intake manifold assembly including an inner shell and an outer shell including an improved joint interface for a laser transmission weld.

The intake manifold assembly includes an outer shell and an inner shell. The outer shell defines a cavity having an inner surface. The inner shell includes a plenum type tube and a plurality of dividers that extend radially outward from the plenum tube. The plenum tube includes a mounting flange for a throttle body. The plenum and the tube may be integrated so as to appear as one part or the tube may remain separate and appear as a throttle zip tube which has the effect of increasing the length of the column of air passing through the throttle body or discharging the air into the plenum in a nominally central location of the manifold. Air entering through the plenum tube flows into the spaces between the dividers. The dividers are jointed at an outer periphery to the outer shell to form the runners or air passages.

The outer shell includes the typical and necessary external features common to all intake manifolds for mounting to an engine. Such features include flanges for mounting to each intake opening of the engine, along with other openings for sensors and other devices that commonly are installed within an intake manifold assembly. The inner shell includes the dividers that provide for and define the runners or air passages that deliver air at a desired pressure and flow rate to each of the engine cylinders. Fully assembled, the inner shell is fully within the outer shell. The dividers are joined to the outer shell to define the separate air passages that delivers airflow to each cylinder.

The outer periphery of the divider is joined to the outer shell by a laser-welded joint. The laser welded joint forms a substantially air tight seal between each divider and the inner surface of the cavity of the outer shell. The laser weld joint is accomplished by application of laser energy along an outside surface of the outer shell. The outer shell is preferably fabricated from a plastic material that is laser translucent to the laser. The inner shell, and specifically the dividers are fabricated from a plastic material that is substantially laser opaque. This preferential material configuration provides for the laser to penetrate the outer shell and reach the inner shell, where the energy from the laser creates a molten pool of plastic within the inner shell at the interface between the inner shell and the outer shell, that cause corresponding melting of the adjacent surface in the outer shell. The plastic then intermixes and forms the desired joint.

The laser device is set a desired distance from the outer surface and moved along the path at a speed determined to provide the desired joint depth and strength. Further, a worker skilled in the art would understand the settings including beam strength, focal length, and feed rate that is required to produce the desired depth of the laser weld joint. A laser weld joint requires contact between parts to be joined and must be accessible to the laser device. The laser device is traversed about the outer surface of the outer shell, however the laser device may also be moved within the cavity to provide desired joints.

The example intake manifold assembly includes the plurality of like shaped dividers that are inserted within a substantially circular outer shell. Processing consideration for assembly of the inner shell to the outer shell requires that each successive divider be of cross-sectional area sufficiently smaller than the preceding divider to aid assembly. The example cavity is stepped such that the smallest diameter or cross-sectional area is at an end distal to initial insertion of the inner shell. Each successive joint location is larger than the preceding such that each divider is easily passed through to the desired location. Each divider abuts a tapered area of the cavity. The tapered area corresponds to a taper on the periphery of the divider. This taper provides for good contact between the two parts to be joined. The laser weld joint is best performed on two parts that are in direct contact with each other.

The intake manifold assembly of this invention provides for a clamping of the inner shell to provide the desirable contact at the joints. The clamping of the inner shell to the outer shell is accomplished by applying a clamping force that selectively collapses the inner shell against the outer shell. The inner shell includes a plurality of deformations provided at selective stages of the inner shell. Application of force compresses and collapses the inner shell at the deformations such that the tapered areas substantially abut the tapered periphery of the dividers. This contact provides a favorable joint for application of the laser.

The intake manifold assembly of this invention includes an innovative joint that provides contact between the inner shell and outer shell and access to the joint area for the laser device. The resulting intake manifold assembly provides for a reduction of component parts and a reduction in part and assembly costs.

These and other features of the present invention can be best understood from the following specification and drawings, the following of which is a brief description.

BRIEF DESCRIPTION OF THE DRAWINGS

FIG. 4 is a schematic view of a collapsible inner shell within the outer shell.

FIG. 5 is a schematic view of the outer shell collapsed onto the inner shell.

FIG. 6 is an enlarged schematic view of an interface between the inner shell and the outer shell.

FIG. 7 is another enlarged schematic view of the interface between the inner shell and the outer shell.

FIG. 11 is a schematic view illustrating assembly of an example intake manifold according to this invention.

FIG. 12 is a cross-sectional view of an example intake manifold according to this invention.

DETAILED DESCRIPTION OF THE PREFERRED EMBODIMENT

Figure 1:
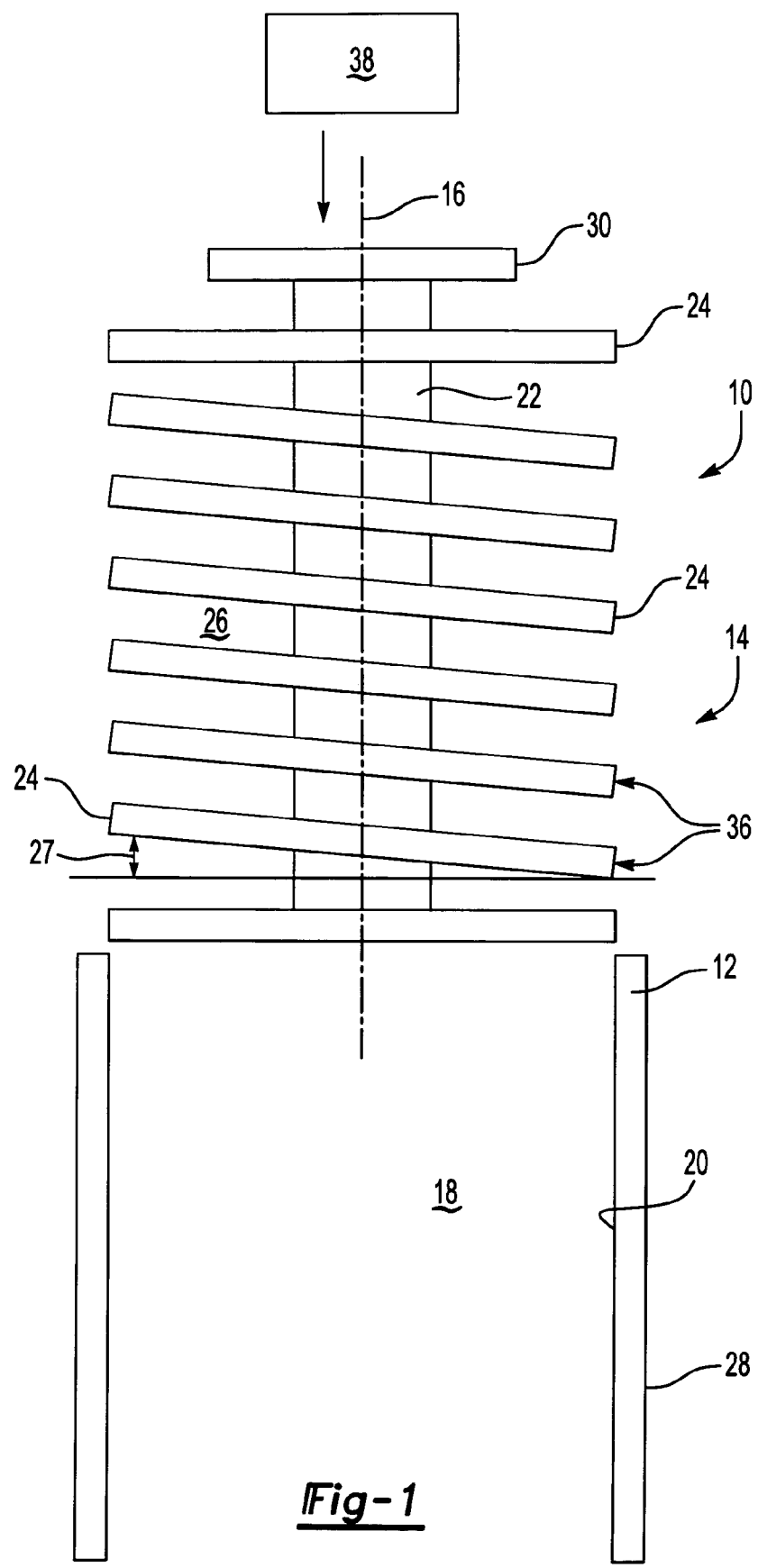
FIG. 1 is a schematic view of an inner shell and an outer shell of an intake manifold according to this invention.

Referring to FIG. 1, an intake manifold assembly 10 includes an outer shell 12 and an inner shell 14. The outer shell 12 and the inner shell 14 are disposed along a longitudinal axis 16. The outer shell 12 defines a cavity 18 having an inner surface 20. FIG. 1 is a schematic illustration of the intake manifold assembly 10 of this invention and does not show such features common to all manifolds. The inner shell 14 includes a plenum tube 22 that extends substantially the entire length of the inner shell 14. A plurality of dividers 24 extend radially outward from the plenum tube 22. The plenum tube 22 includes a mount 30 for a throttle body 38. Air entering through the plenum tube 22 flows into the spaces between the dividers 24. The dividers 24 include an outer periphery 36 that is joined with outer shell 12 to form air passages 26 within the manifold assembly 10.

The inner shell 14 shown includes nine dividers 24 to form the eight air passages 26 required for an eight-cylinder engine. As appreciated, a worker with the benefit of this disclosure will recognize the applicability to other intake manifolds for other engine configurations. The intake manifold assembly 10 of this invention substantially includes only the two parts, the outer shell 12 and inner shell 14. The outer shell 12 includes the typical and necessary external features common to all intake manifolds for mounting to an engine. Such features include flanges for mounting to each intake opening of the engine, along with other openings for sensors and other devices that commonly are installed within an intake manifold assembly. The inner shell 14 includes the dividers 24 that provide for and define the runners or air passages 26 that deliver air at a desired pressure and flow rate to each of the engine cylinders. The dividers 24 are disposed at angle 27 relative to a plane perpendicular to the longitudinal axis 16. The angle 27 accommodates the spacing between cylinders of an engine as known.

Figure 2:
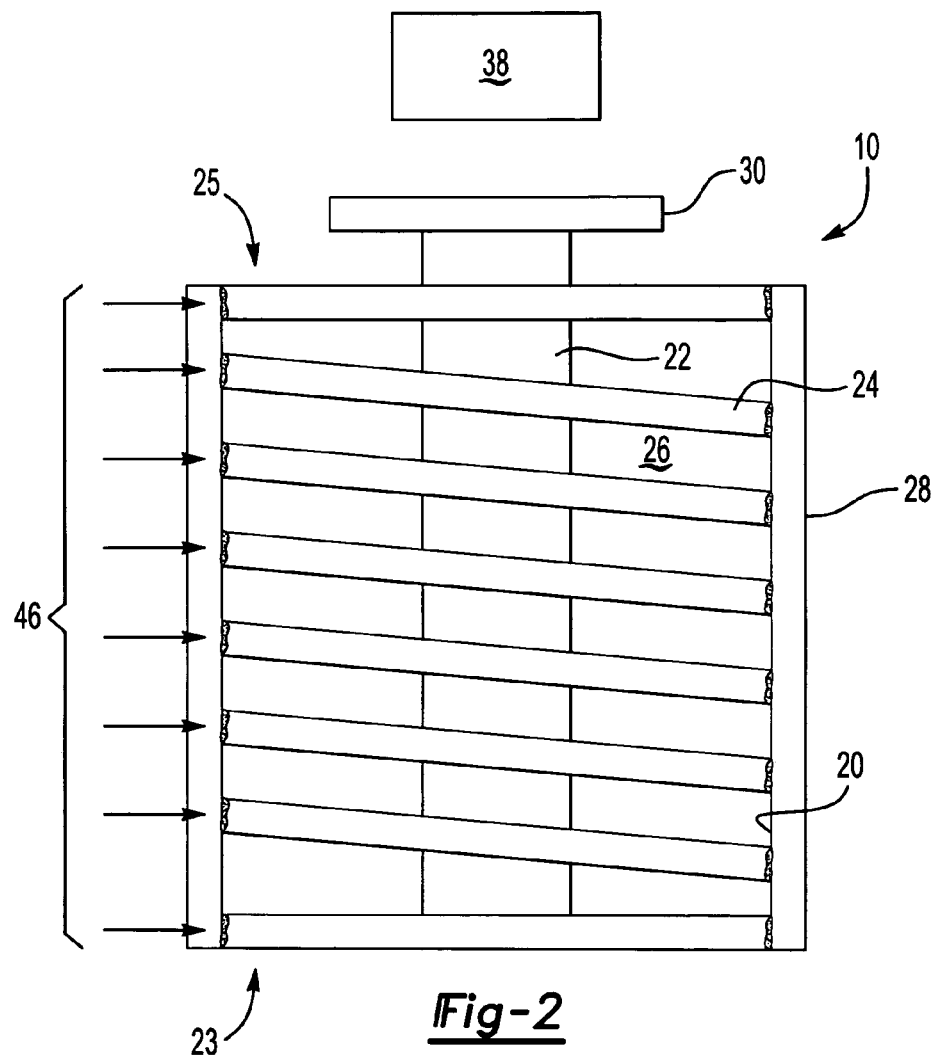
FIG. 2 is a schematic view of the assembled intake manifold.

Referring to FIG. 2, the intake manifold assembly 10 is schematically shown in an assembled state. Fully assembled, the inner shell 14 is fully within the outer shell 12. The dividers 24 are joined to the outer shell 12 to define the separate air passages 26 that deliver airflow to each cylinder. Further, besides defining air passages 26, the dividers 24 provide the structure that defines a first end 23 and a second end 25 of the intake manifold assembly 10. The dividers 24 provide the division between the air passages 26 for each of the cylinders.

In the example embodiment illustrated in FIG. 2 each of the dividers 24 provides a portion of each adjacent air passage 26. That is, the dividers 24 provide a separation wall for two air passages 26. As appreciated, the number of dividers 24 can be modified within the contemplation of this invention to provide for different air passage configuration. Each air passage 26 may be formed from there own set of dividers 24 such that no air passage 26 shares a divider 24. Further, the various air passages 26 can be selectively configured through the use of more or less dividers 24.

The dividers 24 include the outer periphery 36 that is joined to the outer shell 12 by a laser welded joint shown schematically by arrows 46. The laser welded joint 46 forms a substantially air tight seal between each divider 24 and the inner surface 20 of the cavity 18 of the outer shell 12. The laser weld joint 46 is accomplished by application of laser energy along an outer surface 28 of the outer shell 12. The outer shell 12 is preferably fabricated from a plastic material that is substantially laser transparent or translucent to the laser. That is the outer shell 12 is formed from a material that provides for some transmission of the laser through to the inner shell 14. The inner shell 14, and specifically the dividers 24 are fabricated from a plastic material that is substantially laser opaque. This preferential material configuration provides for the laser to penetrate the outer shell 12 and reach the inner shell 14, where the energy from the laser creates a molten pool of plastic within the inner shell 14, that causes corresponding melting of the adjacent surface in the outer shell 12. The laser device 40 is subsequently moved or deactivated, providing for the re-solidification of the melted plastic. The melted plastic from the inner shell 14 intermixes with the melted plastic from the outer shell 12 to form the laser weld joint 46. The laser weld joint 46 provides both the desired structural rigidity to the intake manifold assembly 10 along with the desired air seal between adjacent air passages 26.

Figure 3:
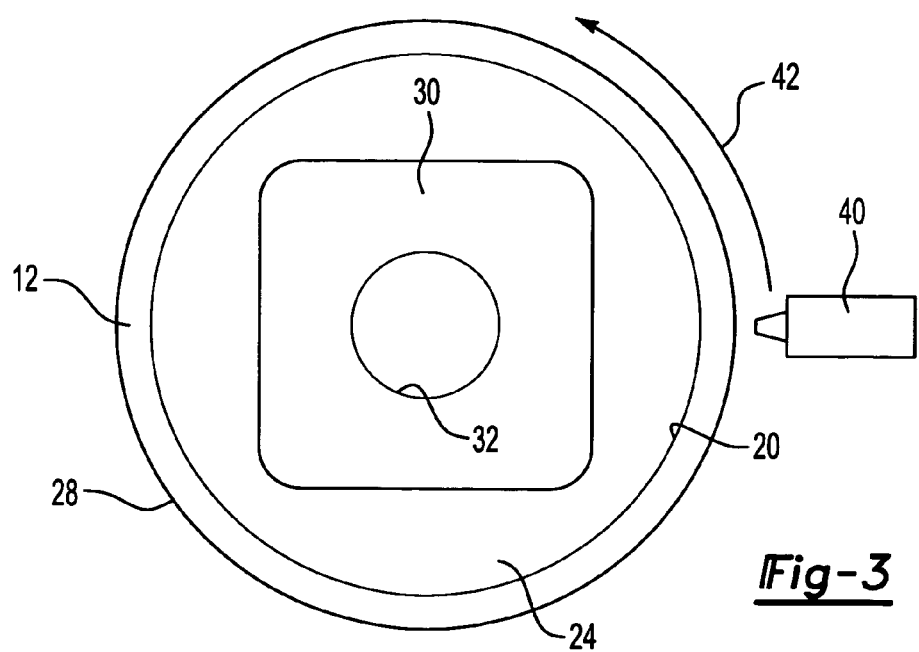
FIG. 3 is a top schematic view of the assembled intake manifold.

Referring to FIG. 3, a top schematic view of the intake manifold assembly 10 is shown and illustrates how the laser weld joint 46 is formed. The example intake manifold assembly 10 is illustrated as substantially circular; however, other shapes as are desired and required for each application are within the contemplation of this invention. Further, example movement of the laser device 40 along the path 42 as circular. A robot as known can be used for moving the laser device 40 along the contours of the intake manifold assembly 10. Movement of the laser device 40 follows a path that provides the desired joint and moves along the contours of the outer surface 28. The example intake manifold assembly 10 is shown with several joints 46 that are substantially linear about the longitudinal axis 16, however, the path and therefore the joint 46 can be any shape as is required to join the dividers 24 to the inner surface 20 of the outer shell 12.

The laser device 40 is set a desired distance from the outer surface 28 and moved along the path 42 at a speed determined to provide the desired joint depth and strength. The specific laser device 40 is as known. Further, a worker versed in the art would understand the settings including beam strength, focal length, and feed rate that is required to produce the desired depth of the laser weld joint. A laser weld joint requires contact between parts to be joined and must be accessible to the laser device 40.

In the example shown in FIG. 3, the laser device 40 is traversed about the outer surface of the outer shell 12, however the laser device 40 may also be moved within the cavity 18 to provide desired joints.

Referring to FIG. 4, the example intake manifold assembly 10 includes the plurality of like shaped dividers 24 that are inserted within a substantially circular outer shell 12. The dividers 24 are shown as substantially identical, however it is not required that each divider be identical, only that the shape of the divider 24 corresponds to the cavity 18. Processing consideration for assembly of the inner shell 14 to the outer shell 12 require that each successive divider 24 be of cross-sectional area sufficiently smaller than the preceding divider 24 to allow for ease of assembly. Assembly of the plurality of dividers 24 into a successive diameter of the same size would make assembly difficult, as each successive divider would require very precise alignment to allow the first divider 24 to be installed to the far end of the outer shell 12.

Accordingly, the example cavity 18 is stepped such that the smallest diameter or cross-sectional area is at an end distal to initial insertion of the inner shell. Each successive joint location is just a bit larger than the preceding such that each divider 24 is easily passed through to the desired location. The difference in relative cross-sectional areas is such that to the naked eye no difference will be perceived. The difference between cross-sectional areas is greatly exaggerated in FIG. 4 to illustrate the specific example configuration.

In the example intake manifold assembly 10 shown, each divider 24 abuts a tapered area 48 of the cavity 18. The tapered area 48 corresponds to a taper on the periphery of the divider 24. This taper provides for good contact between the two parts to be joined. The laser weld joint 46 is best performed on two parts that are in direct contact with each other. The intake manifold assembly of this invention provides for a clamping of the inner shell 14 to provide the desirable contact at the joints 46. The clamping of the inner shell 14 to the outer shell 12 is provide by applying a clamping force 54 that selectively collapses the inner shell 14 against the outer shell 12.

The inner shell 14 includes a plurality of deformations 44 provided at selective stages of the inner shell 14. Application of the force 54 compresses and collapses the inner shell 14 at the deformations 44 such that the tapered areas 48 substantially abut the tapered periphery of the dividers 24. The number of deformations 44 for each collapsible portion along the plenum tube 22 is determined to progressively and selectively collapse the plenum tube 22. The greater the number of deformations 44 the less force required to collapse that section of the plenum tube 22. The deformations 44 can take different forms such as dimples or serrations within the plenum tube. Further, the deformations 44 can be a flexible portion of the plenum tube 22.

The process can proceed by collapsing one divider 24 into the tapered area 48, performing the weld, and then further collapsing the inner shell for the next divider. Alternatively, the entire inner shell 14 may be collapsed at once such that each divider 24 abuts the inner surface 20 of the cavity 18. In either process, the clamping, collapsing of the inner shell 14 produces the desired abutted contact between the dividers 24 and the inner surface 20 of the outer shell 12.

Referring to FIG. 5, another example intake manifold assembly 10 according to this invention includes deformations 52 in the outer shell 12 such that a clamping force 54 is applied to selectively collapse the outer shell 12 into contact with the inner shell 14. The force 54 causes the outer shell 12 to compress enough to contact the periphery 36 of each divider 24. The contact provides the desired joint geometry for the laser weld joint 46.

Additionally, the inner shell 14 can be formed from a plastic material that has less re-enforcing content to encourage local deformations that in turn result in improved contact for welding. The inner shell 14 and the outer shell 12 are formed from a plastic material including re-enforcing material. One of the inner shell 14 and the outer shell 12 is more compliant than the other to facilitate local deformations and improved contacts. The relative compliance between the inner shell 14 and the outer shell 12 is provided by a reduction in the amount of re-enforcing material provided in the more compliant one of the inner shell 14 and outer shell 12. The re-enforcing material present within the inner shell 14 and the outer shell 12 is as known.

Referring to FIG. 6, an enlarged view of the joint 46 is shown and includes the tapered area 48 in proximity to the periphery 36 of the divider. Preferably, the divider 24 contacts the tapered area 48 and the laser device 40 provides the desired energy to form the joint 46. However, the joint 46 can also be formed with a gap 56 between the divider 24 and the outer shell 12. Gaps 56 form due to tolerance stack ups and manufacturing deviations that inevitably are encountered in any assembly and manufacturing process.

Accordingly, it is desirable to develop a process that can accommodate such variations. The joint 46 can be formed between the divider 24 and the outer shell 12 with gaps 56 of up to approximately 0.2 mm. Preferably, the divider 24 is in direct contact with the outer shell 12, however a joint 46 as desired can be formed over gaps 56 of approximately 0.2 mm. Although, a gap of 0.2 mm is described, the specific joint geometry and material may result in more or less of a gap 56 being allowable while still providing a joint as desired.

Referring to FIG. 7, a schematic view of the laser device 40 forming the joint is shown. The laser device 40 transmits energy that forms a molten plastic pool 55 between the inner shell 14 and the outer shell 12. The molten plastic pool 55 intermixes and re-solidifies, resulting in the desired joint 46.

Figure 8:
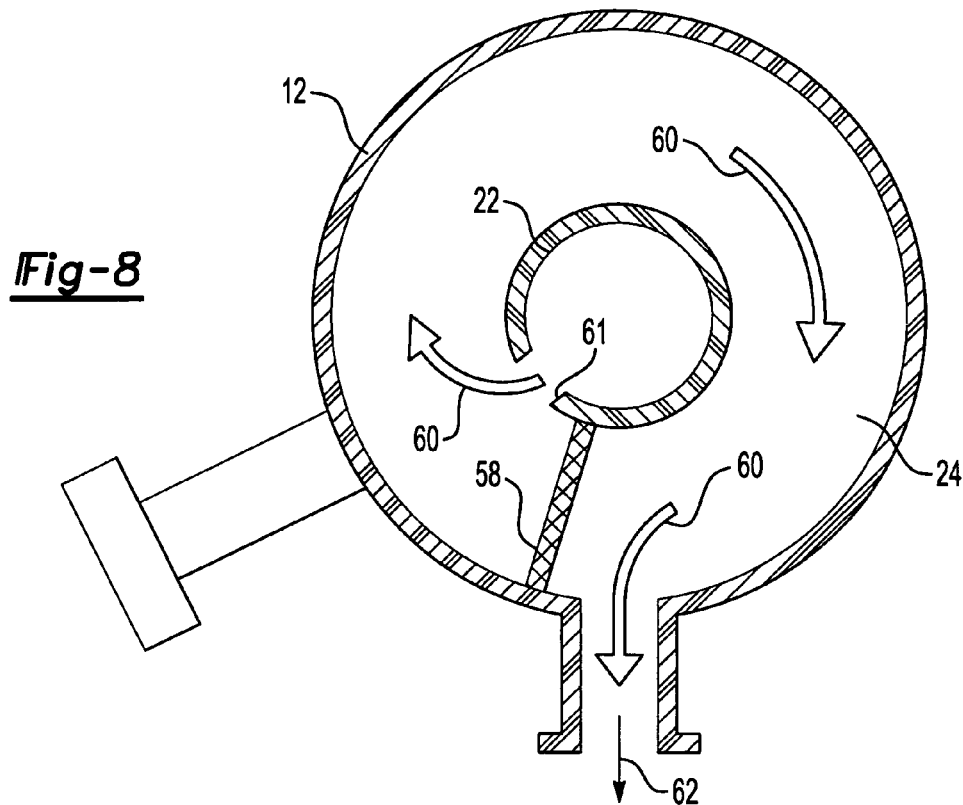
FIG. 8 is a top view schematically illustrating a web segment directing airflow.

Referring to FIG. 8, a schematic view of the example air passage 26 is shown and includes a web section 58. Typically, the length and size of the air passage 26 is carefully selected to provide desired engine performance characteristics. The length of the air passage 26 is closely controlled such that all air passages 26 are of the same length to provide equal airflow to each cylinder and provide equal acoustic lengths to minimize emissions of undesirable noise through the throttle body 38. The web section 58 calibrates the length of the air passage 26 for the example intake manifold assembly 10 as desired.

The web section 58 blocks airflow 60 entering the air passage 26 from the plenum tube 22. Airflow 60 must circulate about the plenum tube 22 before reaching the intake opening 62 to the cylinder. The position of the web section 58 corresponds with opening 61 within the plenum tube 22 to provide the desired length of the air passage 26.

Figure 9:
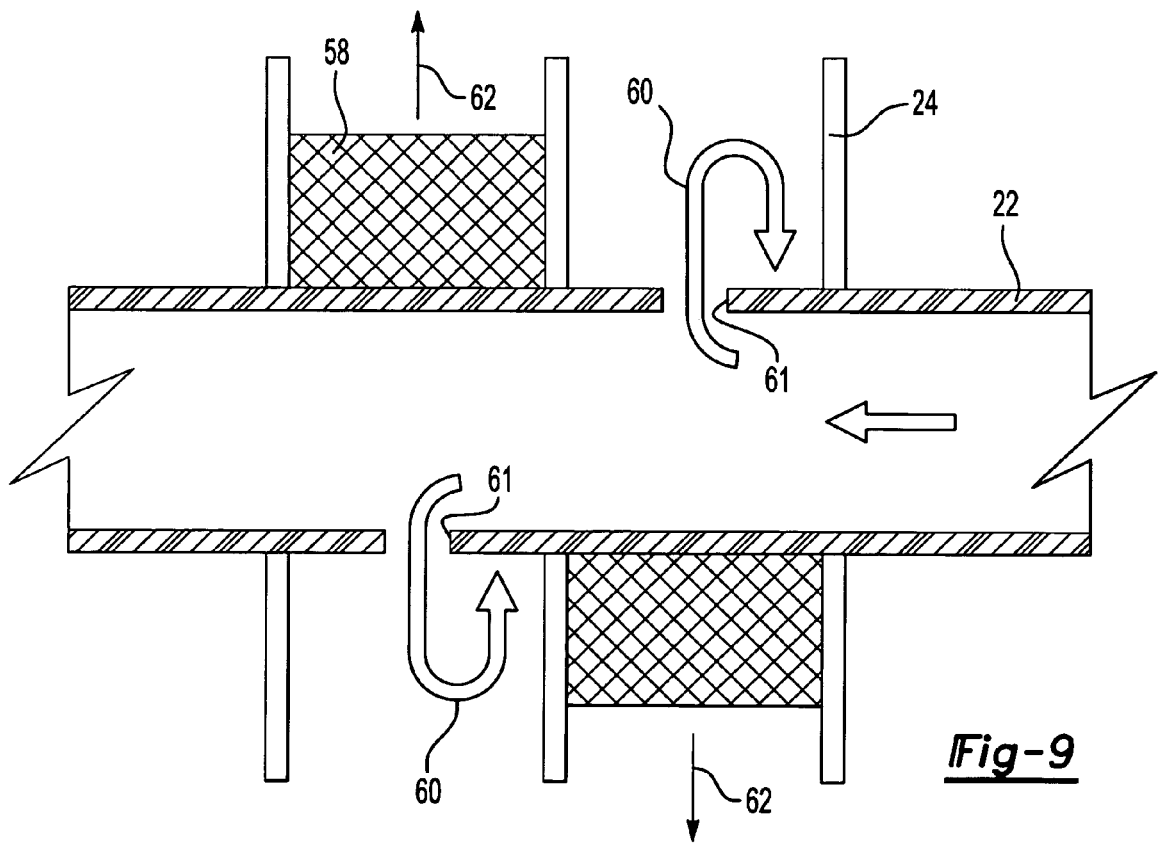
FIG. 9 is a schematic sectional view illustrating blocking and directing of airflow with the web segment.

Referring to FIG. 9, a cross sectional view of adjacent air passages 26 includes the web sections 58 and illustrates how airflow 60 is diverted about the plenum tube 22. The web sections 58 correspond with the openings 61 in the plenum tube 22 to provide the desired length of air passage 26.

Figure 10:
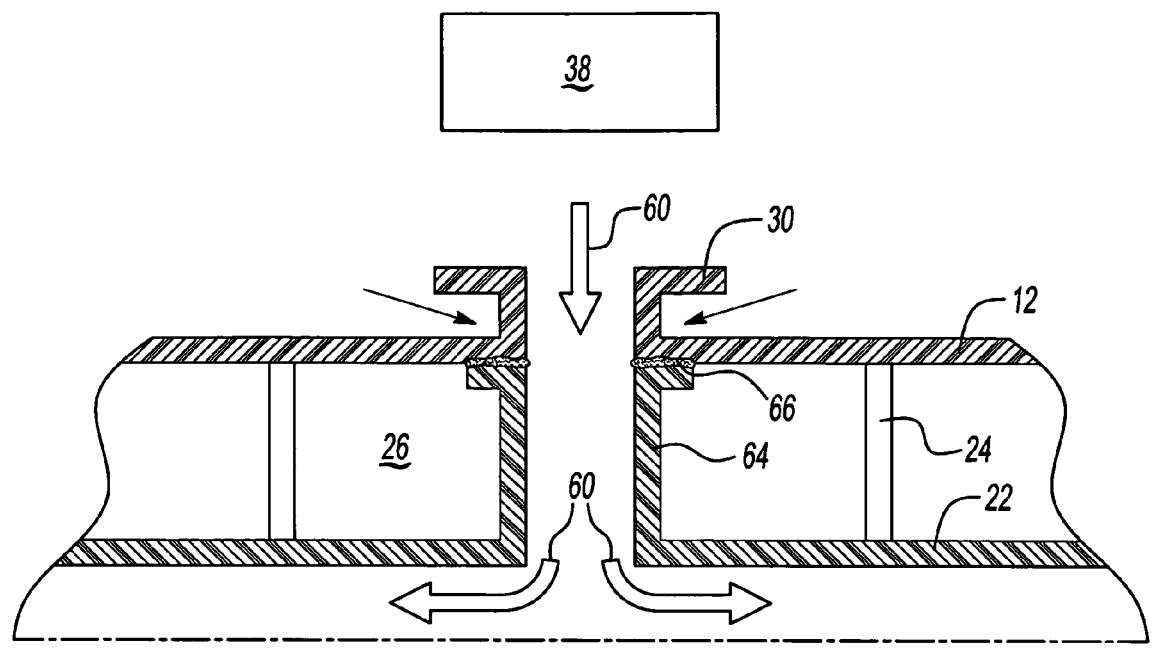
FIG. 10 is a schematic sectional view illustrating a center inlet tube of the inner shell.

Referring to FIG. 10, in another example intake manifold assembly 10 according to this invention, the mount 30 for the throttle body 38 is part of the outer shell 12. The inner shell includes an intake tube 64 that extends transversely from the plenum tube 22. The intake tube 64 provides a conduit for incoming airflow into the plenum tube 22 from a central location of the manifold assembly 10. A laser weld joint 66 seals the interface between the intake tube 62 and the outer shell 12 to provide the desires air passage 26. The mount 30 is illustrated in a central location, however other locations as would be required by application specific requirements are within the contemplation of this invention.

Referring to FIG. 11, another example intake manifold assembly 70 is shown and includes an inner shell 72 that is inserted into an outer shell 74. In previous example embodiments the dividers were illustrated as substantially circular members disposed about a central plenum tube. However, the inner shell 72 need not consist of circular members. The inner shell 72 includes dividers 75 that form air passages 84 through the intake manifold assembly 70.

The dividers 75 are J-shaped channels that include the desired configuration of the air passages. Further, the dividers 75 include an enclosed portion 86 and a walled portion 88. The enclosed portion 86 provides a tube that extends into a cavity 76 of the outer shell 74. The enclosed portion 86 does not require a laser weld joint. The walled portion 88 includes two sides that correspond to inner surfaces 90 of the cavity 76 to form the remainder of the air passage into intake runners 78 within the outer shell 74.

The outer shell 74 defines the cavity 76 and the runners 78 that extend and connect with the engine to communicate air to each engine cylinder. Assembly of the intake manifold assembly 70 includes molding the inner shell 72 and the outer shell 74. The inner shell 72 is inserted into the outer shell 74. The inner shell 72 is then clamped such that surfaces of the inner shell 72 that will form the weld joint with the outer shell 74 are in substantial contact with the inner surface 90 of the outer shell 74. The contact between the inner shell 72 and the outer shell 74 is preferably within a desired gap range to provide the desired laser weld joint.

The laser device 40 is traversed along the outer surface 91 of the outer shell 74 along a predetermined path 82. The predetermined path 82 corresponds with the position of the inner shell 72 such that the desired laser weld joint is formed. The predetermined path 82 is illustrated as a simple rectangular path; however, the path of the laser device 40 can be of any shape required to provide the desired air passages and intake mold configuration. Once the laser weld joint is complete, the intake manifold assembly 70 is substantially complete except for assembly of external devices such as the throttle body 38, sensors and other hardware supporting operation.

Referring to FIG. 12, the assembled intake manifold assembly 70 is shown as a cross-section through the mount 30. Airflow 80 through the mount 30 enters the cavity 76. The cavity 76 is in communication with each of the air passages formed by the dividers 75. In this example intake manifold assembly 70 the dividers 75 include the enclosed portion 86 that extends into the cavity 76. Airflow 80 entering the enclosed portion 86 flows through the air passage to the walled portion 88. The walled portion 88 cooperates with the inner surface 90 to define the remainder of the air passage.

Forming of the laser weld joint along the weld path 82 provides the desired structural connection between the inner shell 72 and outer shell 74. Further the laser weld joint provides the air sealing required to isolate airflow to each cylinder. The laser weld joint requires no special joint configuration, other than the need to provide sufficient weld area, and to provide access to the joint area.

The example intake manifolds of this invention provide a substantial reduction in the number of parts, along with a substantial simplification in the joint between manifold parts. The example intake manifolds described include substantially two components, however, additional components as be required for a specific application would also benefit from the simplified joint configuration and laser weld process. Further, the example intake manifold substantially reduces assembly and manufacture time and expense.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of fabricating an intake manifold assembly comprising the steps of:
   a. inserting an inner shell into a cavity defined by a second shell;
   b. clamping said inner shell against an inner surface of said second shell and selectively collapsing portions of at least one of said inner shell and said second shell to abut said inner shell with said inner surface of said second shell; and
   c. welding said inner shell to said inner surface of said cavity of said second shell.

2. The method as recited in claim 1, wherein said step b. comprises using a laser device for forming a joint between said inner shell and said second shell.

3. The method as recited in claim 2, including the step of moving said laser device about an outer surface of said second shell during said step b.

4. The method as recited in claim 3, including the step of moving said laser device within said cavity during said step b.

5. The method as recited in claim 1, wherein said clamping step comprises clamping said inner shell to said inner surface such that no more than a 0.2 millimeter gap exists between said second shell and said inner shell.

6. The method as recited in claim 5, comprising generating deformities within said inner shell for controlling collapsing of said inner shell against said second shell.

7. The method as recited in claim 5, including the step of generating deformities within said second shell for controlling collapsing of said second shell relative to said inner shell.

8. The method as recited in claim 1, wherein said inner shell comprises a plurality of dividers, wherein said step b includes welding at least a portion of each of said dividers to said second shell.

9. A method of fabricating an intake manifold assembly comprising the steps of:

a. inserting an inner shell into a cavity defined by a second shell, wherein said inner shell comprises a plurality of dividers;
b. welding said inner shell to an inner surface of said cavity of said second shell including welding at least a portion of each of said plurality of dividers to said second shell, wherein each of said plurality of dividers includes a peripheral edge, and a portion of said peripheral edge of each of said plurality of dividers is welded to said outer shell.

10. The method as recited in claim 8, including the step of defining a plurality of air passages with said plurality of dividers.

11. The method as recited in claim 10, including providing a web section between at least two of said plurality of dividers for blocking a portion of airflow through said passage.

12. The method as recited in claim 11, wherein said inner shell comprises a plenum tube and including the step of forming said plurality of dividers on said plenum tube such that said dividers extend radially outward from an outer surface of said plenum tube.

13. The method as recited in claim 11, including the step of attaching a mounting pad for a throttle body to said plenum tube.

* * * * *